US012627486B2

(12) United States Patent
Danna et al.

(10) Patent No.: US 12,627,486 B2
(45) Date of Patent: May 12, 2026

(54) NON-FUNGIBLE TOKEN (NFT) VEHICLE INFORMATION

(71) Applicant: Capital One Services, LLC, McLean, VA (US)

(72) Inventors: Russell Danna, Rockwall, TX (US); Landon M. Nehmer, McKinney, TX (US); Michael Garner, Carrollton, TX (US)

(73) Assignee: Capital One Services, LLC, McLean, VA (US)

(*) Notice: Subject to any disclaimer, the term of this patent is extended or adjusted under 35 U.S.C. 154(b) by 708 days.

(21) Appl. No.: 18/175,474

(22) Filed: Feb. 27, 2023

(65) Prior Publication Data

US 2024/0291649 A1     Aug. 29, 2024

(51) Int. Cl.
*H04L 29/06* (2006.01)
*H04L 9/00* (2022.01)
*H04L 9/08* (2006.01)

(52) U.S. Cl.
CPC .............. *H04L 9/088* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 2021/0042744 A1* | 2/2021 | Zheng | ................. | G06Q 20/401 |
| 2021/0176050 A1* | 6/2021 | Lidzborski | ............ | H04L 9/0877 |

| | | | | |
|---|---|---|---|---|
| 2021/0273796 A1* | 9/2021 | Henderson | ............... | G09C 1/00 |
| 2023/0042500 A1* | 2/2023 | Grix | ...................... | H04L 9/3213 |
| 2023/0085481 A1* | 3/2023 | Padmanabhan | .... | G06Q 30/0601 |
| | | | | 705/64 |
| 2023/0085677 A1* | 3/2023 | Copeland | ............... | G06Q 30/06 |
| | | | | 705/66 |
| 2023/0108366 A1* | 4/2023 | Tang | .................. | G06Q 20/3829 |
| | | | | 705/66 |
| 2023/0108369 A1* | 4/2023 | Bachoura | ............. | G06Q 20/102 |
| | | | | 705/50 |
| 2023/0259640 A1* | 8/2023 | Metzler | ............... | G06F 21/6218 |
| | | | | 713/191 |
| 2023/0298001 A1* | 9/2023 | Jethmalani | ........... | G06Q 20/065 |
| | | | | 705/65 |

(Continued)

*Primary Examiner* — Ali H. Cheema
*Assistant Examiner* — Hassan A Hussein
(74) *Attorney, Agent, or Firm* — Foley & Lardner LLP

(57) ABSTRACT

Methods and systems are described herein for transferring control of vehicle information. A transfer system may be used to facilitate the transfer. The system may receive a first request for transferring an association of a vehicle from a first user to a second user. The transfer system may generate a first blockchain operation for transferring control of the cryptographic token from a first to second cryptography-based storage application associated with the first user and second user, respectively, wherein the first blockchain operation comprises the second address associated with the second cryptography-based storage application. The system may transmit the first blockchain operation for transferring control of the cryptographic token to the second cryptography-based storage application. In response to receiving an indication of successful blockchain operation from a blockchain node, the system may transmit a command to update first user identification data stored at a link.

18 Claims, 7 Drawing Sheets

(56)                    References Cited

U.S. PATENT DOCUMENTS

| | | | |
|---|---|---|---|
| 2024/0039721 A1* | 2/2024 | Young | H04L 9/3213 |
| 2024/0048361 A1* | 2/2024 | Berger | H04L 9/088 |
| 2024/0061917 A1* | 2/2024 | Wang | G06Q 10/0639 |
| 2024/0062190 A1* | 2/2024 | Rymer | H04L 9/50 |
| 2024/0064008 A1* | 2/2024 | Wright | G06Q 20/3825 |
| 2024/0146523 A1* | 5/2024 | DeLuca | H04L 9/088 |
| 2024/0181987 A1* | 6/2024 | Stefanovski | H04L 9/50 |
| 2024/0195626 A1* | 6/2024 | Hale | H04L 9/3239 |
| 2025/0342232 A1* | 11/2025 | Shepherd | G06F 21/1014 |

* cited by examiner

200

300

| Token ID | Owner Address | Resource Identifier |
|---|---|---|
| 303 | 306 | 309 |
| <Identification Data> | <Address Data> | <Resource Identifier> |

400

| Vehicle Identification Data | \<Vehicle Data\> |
| User Identification Data | \<User Data\> |
| Address Data | \<Address Data\> |

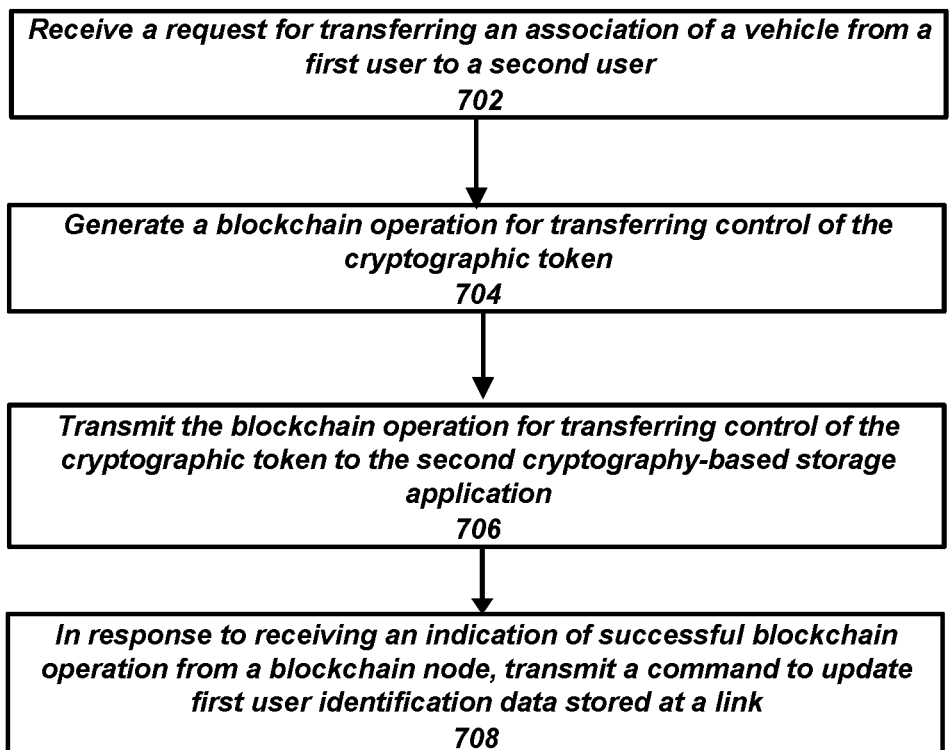

Receive a request for transferring an association of a vehicle from a
first user to a second user
702

Generate a blockchain operation for transferring control of the
cryptographic token
704

Transmit the blockchain operation for transferring control of the
cryptographic token to the second cryptography-based storage
application
706

In response to receiving an indication of successful blockchain
operation from a blockchain node, transmit a command to update
first user identification data stored at a link
708

FIG. 7

NON-FUNGIBLE TOKEN (NFT) VEHICLE INFORMATION

BACKGROUND

Transfer of title, such as vehicle title, is completed by performing multiple transactions between multiple parties. To ensure that only the appropriate parties are completing the transfer, each of these parties typically takes part in a complex process requiring physical authentication, such as by a notary, by providing multiple forms of identification at a third party (e.g., Department of Motor Vehicles (DMV)), and/or the like. For example, even in the simple case of transferring a vehicle title, the transferring party must first release ownership of the vehicle by signing a physical title and subsequently provide the signed title to the person to whom the vehicle is transferred to (e.g., via mail or physical transaction). The person to whom the vehicle is transferred to must then provide the signed title to the DMV (e.g., by mail or physical transaction), and the state may subsequently issue a new registration and title showing ownership of the vehicle. In some cases, the transfer process may require additional forms to be filled out making the process even more painful. Accordingly, a mechanism is desired that would enable individuals or entities to transfer a title to an item (e.g., a vehicle) and for institutions to maintain data regarding such transfers without the need for multiple physical transactions and physical authentication between several parties.

SUMMARY

One mechanism to enable both users and institutions to transfer vehicle titles may use blockchain technology and, in particular, cryptographic tokens (e.g., non-fungible tokens, also known as NFTs). Therefore, methods and systems are described herein for transferring vehicle titles (or other types of titles) of users using cryptographic tokens (e.g., NFTs). The cryptographic tokens may represent a title of a vehicle and may enable a user to access information regarding the vehicle. For example, the cryptographic token may include an encrypted payload storing a resource identifier (e.g., uniform resource identifier (URI)) identifying information associated with the vehicle (e.g., details regarding the car, previous owner(s), current status, past owner(s), etc.). Control of the cryptographic token by a cryptographic address associated with a user may indicate that the user owns the vehicle (e.g., controls the title). A transfer system may be used to perform operations described herein.

The cryptographic tokens may be used by the transfer system as described below. The transfer system may receive a request from a user device (e.g., a user device associated with the user who owns or otherwise uses the vehicle) for transferring an association (e.g., ownership) of a vehicle to a second user (e.g., a new owner of the vehicle). The request may include an identifier of the cryptographic token that associates the vehicle and the first user. For example, the request may include an identifier of a NFT described above.

In addition, as described above, the identified cryptographic token may be associated with an encrypted payload that stores a resource identifier (e.g., uniform resource identifier (URI)) identifying information associated with the vehicle. The request may further include second user data (e.g., identification information of the second user, etc.) and a second address of a second cryptography-based storage application associated with the second user.

In response to the request, the system may generate a blockchain operation for transferring control of the cryptographic token from a first cryptography-based storage application associated with the first user to the second cryptography-based storage application identified in the request. In some embodiments, transfer of control may be between two cryptographic addresses. The transfer system may transmit, to the user device, the blockchain operation for transferring control of the cryptographic token to the second cryptography-based storage application.

Once the system receives an indication that the blockchain operation was successful (e.g., the cryptographic token is controlled by the second cryptography-based storage application of the second user), the system may transmit, to a remote computing device, a command to update first user identification data stored at a link (e.g., the resource identifier). The command to update the first identification data may include second user identification data. In this way, the cryptographic token may include an encrypted reference (i.e., the encrypted payload storing the URI) to information corresponding to the new owner (e.g., the second user).

To use the cryptographic token as described above, the transfer system may first cause the cryptographic token to be generated. The transfer system may receive a request from a first user's device (or from another suitable device such as a device associated with a manufacturer or distributor) for generating a cryptographic token (e.g., NFT). The request may include vehicle identification data, first user identification data, and an address of a cryptography-based storage application corresponding to the first user. For example, when a user acquires a vehicle, the user may request that an NFT is generated for the title of the vehicle. The request may be generated to include vehicle identification data (e.g., vehicle identification number, make, model and/or other vehicle identification data), user identification data (e.g., name, address, etc.), and a cryptographic address associated with the user (e.g., controlled by the user's cryptography-based storage application).

In some embodiments, the system may store the first user identification data at the remote computing device (e.g., a database system). For example, the remote computing device may store the data and generate a link identifying a location to access the data at the remote computing device. The data may be encrypted and only available for access by authenticated parties. The remote computing device may provide the link to the transfer system. Furthermore, the transfer system may generate a blockchain operation request (e.g., to be executed by a blockchain node) for generating a cryptographic token storing the link as a uniform resource identifier (URI).

In some examples, the transfer system may encrypt the uniform resource identifier into an encrypted payload using a first key associated with the first cryptography-based storage application. Additionally, the system may insert, into the cryptographic token, the encrypted payload. Further, when transferring control of the cryptographic token, the system may update (e.g., change, add, etc.) the encrypted payload so that it stores the resource identifier encrypted with a public key of the new owner. For example, the process of transferring control of the cryptographic token may further include requesting the user device (e.g., seller's device) decrypt the encrypted payload, e.g., using the private key of the user's first cryptography-based storage application. In particular, the system may transmit a request that the device associated with the cryptography-based storage application having control of the cryptographic token (e.g., owner's device) decrypt the encrypted payload to obtain the resource identifier. The user device may decrypt the encrypted payload with the private key associated with the associated cryptography-based storage application and transmit the decrypted resource identifier to the transfer system.

The transfer system may also enable transfers when the vehicle is used by a user but owned by a third-party and is transferred to another user. In these cases, the transfer system may use cryptographic addresses (e.g., associated with cryptography-based storage applications) of all three parties in the transfer of the vehicle title. In particular, the owner's cryptography-based storage application may be used to perform the transfer in response to a request from a cryptography-based storage application of the user of the vehicle.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 4 illustrates at least a portion of a data structure for a request for generating a cryptographic token, in accordance with one or more embodiments of this disclosure.

FIG. 7 is a flowchart of operations for transferring control of vehicle information, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
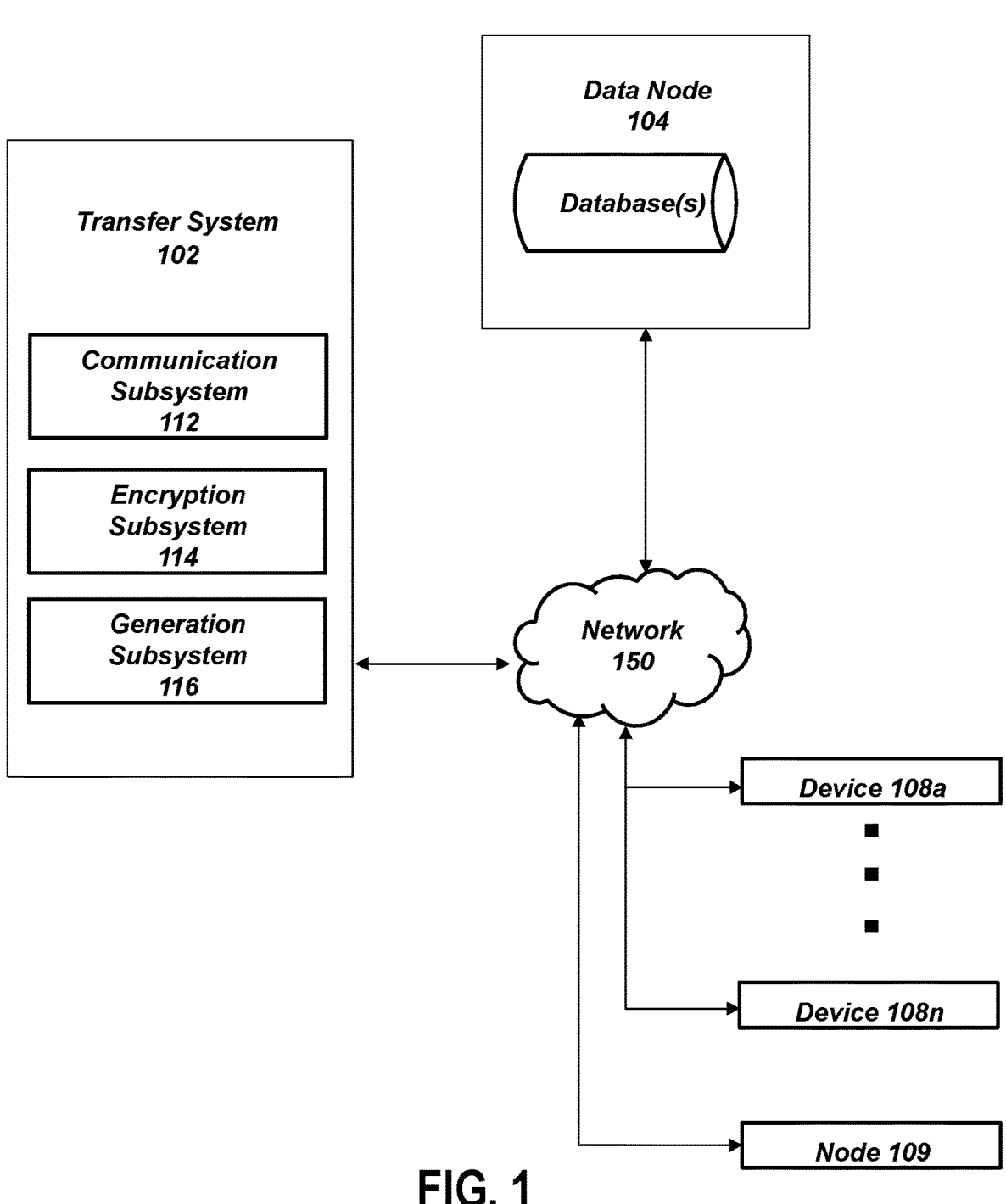
FIG. 1 shows an illustrative system for transferring control of vehicle information using NFTs, in accordance with one or more embodiments of this disclosure.

FIG. 1 is an example of environment 100 for transferring control of vehicle information using non-fungible tokens (NFTs). For example, environment 100 may be used to generate and transfer NFTs. Environment 100 includes transfer system 102, data node 104, devices 108a-108n (e.g., each associated with a cryptography-based storage application and/or a user), and node 109. Transfer system 102 may execute instructions for transferring control of vehicle information using NFTs as well as causing generation of the NFTs.

Transfer system 102 may include software, hardware, or a combination of the two. For example, Transfer system 102 may be hosted on a physical server or a virtual server that is running on a physical computer system. In some embodiments, Transfer system 102 may be configured on a user device (e.g., a laptop computer, a smartphone, a desktop computer, an electronic tablet, or another suitable user device). Transfer system 102 may be in communication (e.g., via network 150) with a node contributing to a blockchain and which may execute operations on a blockchain node, such as node 109. Node 109 may be any computer or processor configured to run a blockchain's software and to validate and store transactions on the network.

Data node 104 may store various data, including user data, copies of on-chain programs, and/or other suitable data. Data node 104 may include software, hardware, or a combination of the two. For example, data node 104 may be a physical server, or a virtual server that is running on a physical computer system. In some embodiments, transfer system 102 and data node 104 may reside on the same hardware and/or the same virtual server/computing device. Network 150 may be a local area network, a wide area network (e.g., the Internet), or a combination of the two.

Figure 6:
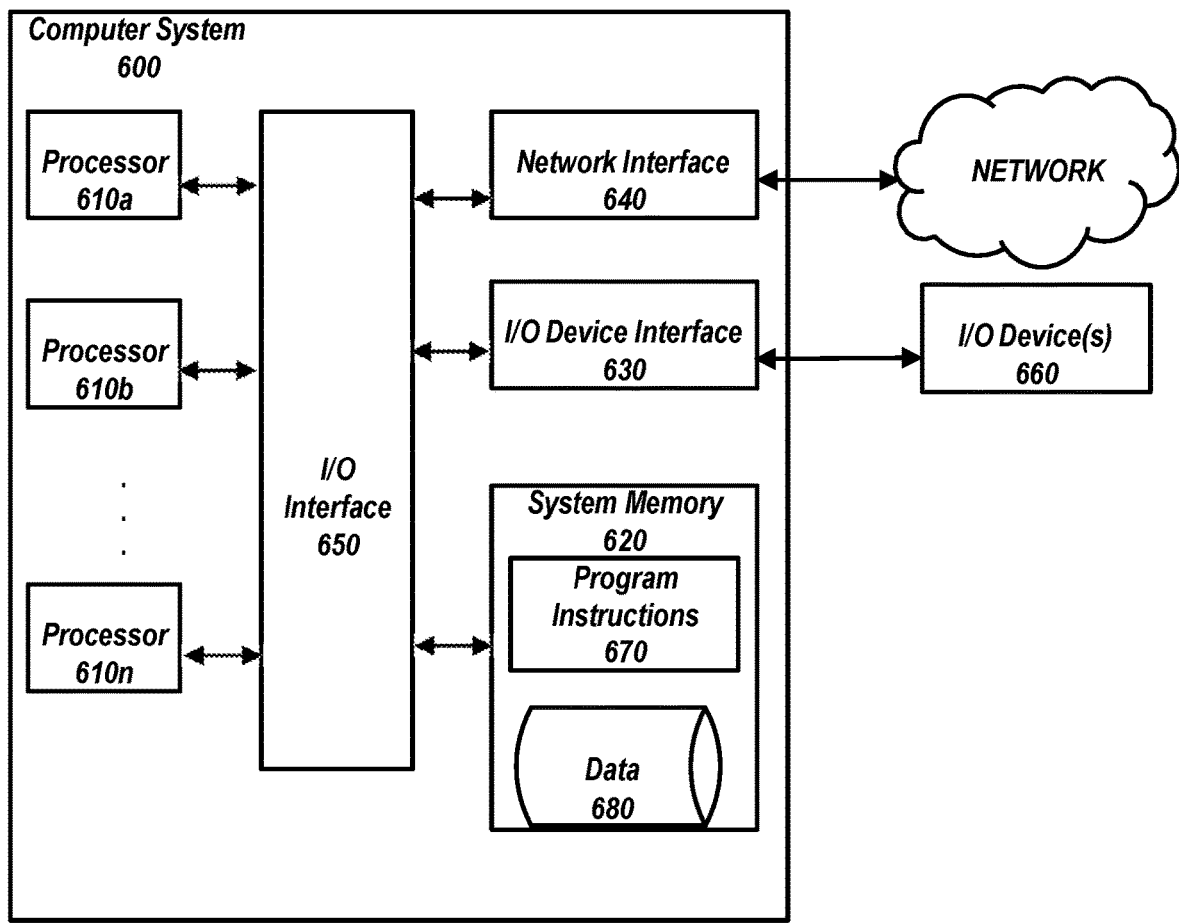
FIG. 6 illustrates a computing device, in accordance with one or more embodiments of this disclosure.

Devices 108a-108n may include software, hardware, or a combination of the two. For example, FIG. 6 shows exemplary computer systems that may be included in each of devices 108a-108n. Each device of devices 108a-108n may be associated with a cryptography-based storage application that may also include software, hardware, or a combination of the two. For example, each cryptography-based storage application may include software executed on one or multiple devices or may include hardware such as a physical device. In some cases, the cryptography-based storage application may be software and may be stored in user devices (e.g., client devices such as smartphone, laptops, electronic tablets, etc.), and a user of the cryptography-based storage application may access the cryptography-based storage application on those devices. Alternatively, or additionally, the cryptography-based storage application may reside on a special device (e.g., a fob) intended for storing the cryptography-based storage application. For example, the device may store private keys in a memory of the device and allow transactions to be signed (e.g., via generating a cryptographic signature) on the device itself. Examples of cryptography-based storage applications may include cryptographic wallets. For example, a cryptography-based storage application may be referred to as a digital wallet (e.g., hot wallet, cold wallet, etc.). As described herein, some examples of hardware cryptographic wallets include Ledger®, and Trezor®. Software cryptographic wallets may include Metamask® and others.

Transfer system 102 may receive a request to transfer control of vehicle information (e.g., using NFTs). For example, vehicle information may include information such as previous owner information, current owner information, year and make of the vehicle, type of vehicle (e.g., automobile, boat, snowmobile or ATV), vehicle identification number (VIN) or the hull identification number (HIN), date of the sale, purchase price, names and signatures of the buyer and the seller, and/or the like. Requests to transfer control of vehicle information may include, for example, a request for transferring an association of a vehicle from a first user to a second user, e.g., by transferring control of a cryptographic token from a first to second cryptography-based storage application associated with the first and second user. As described herein, the cryptographic token may include an encrypted payload storing a resource identifier (e.g., uniform resource identifier (URI)) identifying information associated with the vehicle (e.g., details regarding the car, previous owner(s), current status, past owner(s)). For example, the information associated with the vehicle, and stored at the location indicated by the resource identifier, may include vehicle history, such as a maintenance history (e.g., types of maintenance performed and at dates/times of the maintenance, condition of the vehicle, etc.). Control of the cryptographic token by a cryptography-based storage application associated with a user may indicate that the user owns the vehicle.

In some embodiments, transfer system 102 may receive the requests using communication subsystem 112. Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may receive one or more requests to transfer the association of the vehicle from the first to second user from one of devices 108a-108n. Communication subsystem 112 may pass at least a portion of the data included in requests to transfer control of vehicle information, or a pointer to the data in memory, to other subsystems such as generation subsystem 116 and/or encryption subsystem 114.

Encryption subsystem 114 may include software components, hardware components, or a combination of both. Encryption subsystem 114 may be used to encrypt data, such as resource identifiers, vehicle information, user identification information, etc., for example, using a public or private key associated with the cryptography-based storage application of the first or second user to obtain an encrypted payload. Encryption subsystem 114 may pass at least a portion of the encrypted payloads, or a pointer to the encrypted payloads in memory, to other subsystems, such as generation subsystem 116 and/or communication subsystem 112.

Generation subsystem 116 may include software components, hardware components, or a combination of both. For example, generation subsystem 116 may include software components (e.g., API calls) that access and/or execute programs such as on-chain programs to generate tokens (e.g., cryptographic tokens). Generation subsystem 116 may access the data included in the request to transfer control of the vehicle information. In some examples, the request data may include an identifier of a cryptographic token that associates the vehicle and the first user, second user data, and a second address of a second cryptography-based storage application associated with the second user. Components of the request for transferring control of vehicle information are described further herein with reference to FIG. 2.

Figure 2:
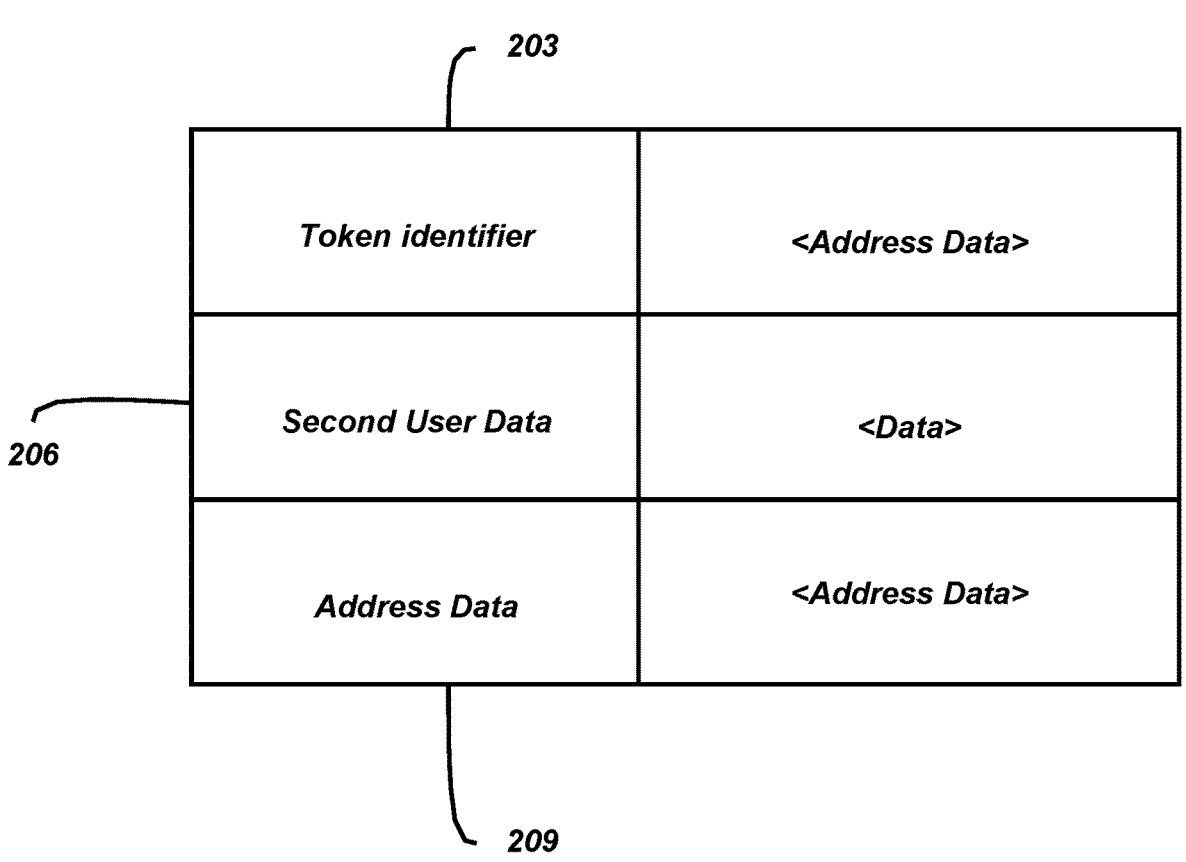
FIG. 2 illustrates at least a portion of a data structure for a request for transferring control of vehicle information, in accordance with one or more embodiments of this disclosure.

FIG. 2 illustrates at least a portion of a data structure for a request for transferring control of vehicle information. As described herein, exemplary data structure 200 for a request for transferring control of the vehicle information may include token identifier 203, second user data 206, and address data 209. Token identifier 203 may store data identifying a token, such as a cryptographic token (e.g., NFT). An exemplary cryptographic token is described herein with reference to FIG. 3.

The token identifier 203 may be an identifier (e.g., an address of the on-chain contract that generated the token, a unique identifier of the token, etc.). In some examples, the token identifier may indicate a string of alphanumeric characters, such as a unique identification number. For example, where a first user associated with a first cryptography-based storage application requests to transfer control of vehicle information to a second user, the request may include the token identifier to identify a cryptographic token (e.g., NFT). For example, the token identifier may identify a cryptographic token that may be associated with an encrypted payload that stores a resource identifier such as a URI that identifies user identification data (e.g., first user identification data), vehicle information and/or the like. In some examples, token identifier 203 may be a string of alphanumeric characters. For example, token identifier 203 may be a string of 256 alphanumeric characters and may identify an NFT (e.g., a unique uint 256 ID inside an on-chain contract associated with the token).

Exemplary data structure 200 may also include second user data 206 and address data 209. The second user data may include information regarding the second user (e.g., the buyer of the vehicle) associated with the second cryptography-based storage application to which control of the vehicle information is being transferred. The second user data may include, for example, user identification data may include driver's license, proof of auto insurance, financing documents (if applicable), proof of residence, proof of income, credit score and/or the like.

The address data 209 may indicate the address of the second cryptography-based storage application to which the cryptographic token identified by token identifier 203 is requested to transfer control to. In some examples, the address data may be a string of alphanumeric characters. For example, the address may be a string of 32 alphanumeric characters and may identify what is sometimes referred to as a cryptographic wallet (e.g., a digital wallet). Some examples of hardware cryptographic wallets include Ledger®, and Trezor®. Software cryptographic wallets may include Metamask® and others.

In response to receiving a request of exemplary data structure 200, generation subsystem 116 may generate a blockchain operation for transferring control of the cryptographic token to the second cryptography-based storage application. The cryptographic token may be controlled by the first cryptography-based storage application. The blockchain operation may include the address of the second cryptography-based storage application. For example, generation subsystem 116 may generate a blockchain operation for a blockchain node that may call and execute an on-chain program to transfer the cryptographic token. An on-chain program may be a computer program or any suitable code for performing computing operations stored on a blockchain. For example, an on-chain program may reference a program stored on a blockchain, or other distributed ledger. On-chain program may be used to automate the execution of a transaction, such as a blockchain operation. In another example, an on-chain program may refer to a smart contract. In some cases, the on-chain program may run when predetermined conditions are satisfied. In one example, the on-chain program may be a smart contract deployed on a blockchain. The transfer system 102 may transmit to the first device (e.g., the owner's device), the blockchain operation for transferring control of the cryptographic token to the second cryptography-based storage application.

In some examples, the on-chain program (e.g., smart contract) may be a contract configured to transfer association of the car only in response to certain predetermined conditions. For example, the request for transferring an association of a vehicle from a first user to a second user may also include a cost (e.g., an amount of financial asset such as cryptocurrency, money, and/or the like) the second user owes for the transfer of association. In some examples, such as when the financial cost is a cryptographic asset (e.g., NFT, cryptocurrency, etc.), the on-chain program may automatically execute the transfer of the cryptographic asset (e.g., cryptocurrency) from the second user to the first user as well as the transfer of the association of the vehicle from the first user to the second user via a cryptographic address and a user's device hosting the associated cryptography-based storage application for signing the transfer request. In other examples, such as when the financial cost is not a cryptographic asset, the on-chain program may wait to execute the transfer of the association of the vehicle from the first user to the second user until the transfer system and/or the user device of the first user confirms a correct amount of financial cost to be paid to the first user.

According to some embodiments, in response to receiving an indication of successful blockchain operation from a blockchain node, the system may transmit to a remote computing device (e.g., data node 104), a command to update first user identification data stored at a link (e.g., resource identifier). The command to update the first user identification data may include second user identification data. For example, the remote computing device may add or replace the data stored at a location identified by the link/resource identifier using the second user identification data. In some embodiments, the remote computing device may be a database server storing the data in a database table.

Figure 3:
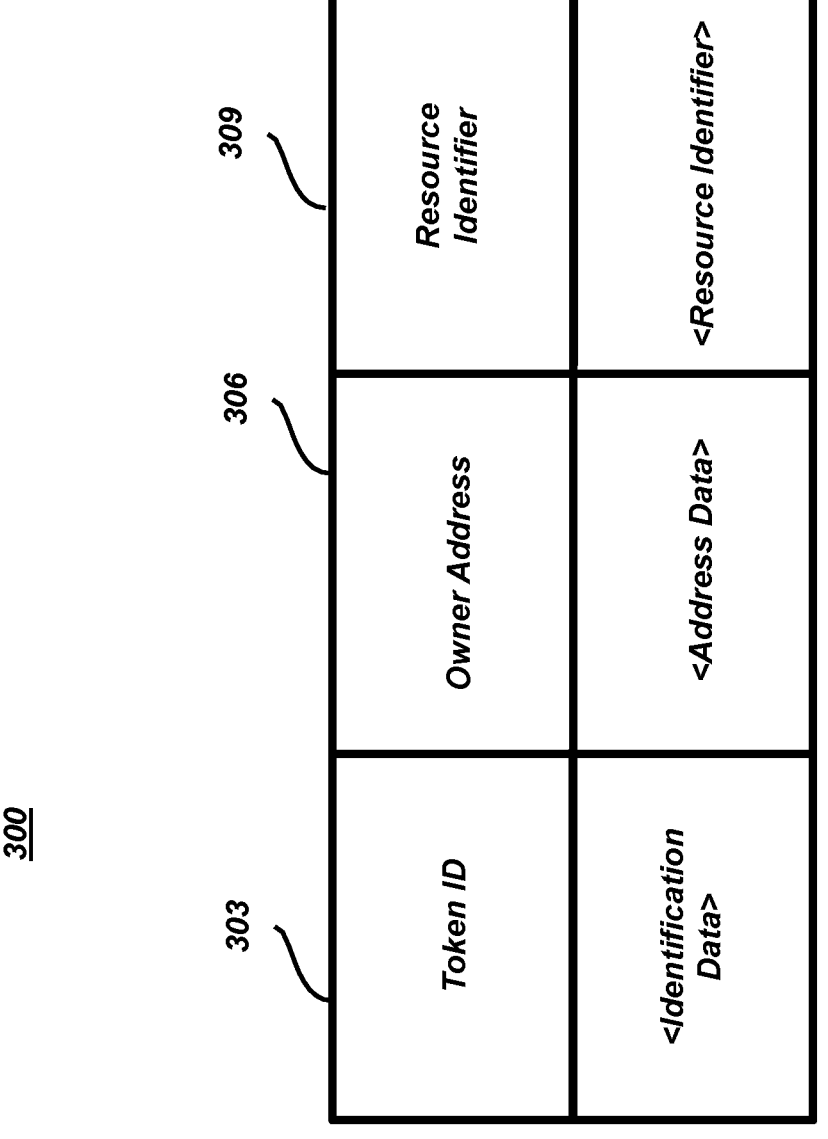
FIG. 3 illustrates at least a portion of a data structure representing a cryptographic token, in accordance with one or more embodiments of this disclosure.

According to some embodiments, the token identified by token identifier 203 may be a cryptographic token, such as one illustrated by data structure 300. For example, such a cryptographic token may be generated in response to a first user's request to generate a cryptographic token, such as a cryptographic token storing vehicle information, described in detail with reference to FIG. 4. FIG. 3 illustrates a data structure 300 representing a cryptographic token generated by generation subsystem 116. Data structure 300 may include token identifier 303, owner address 306, and resource identifier 309. Token identifier 303 may be an identifier for the cryptographic token and may have a value such as an unsigned integer value from 8 bits to 256 bits. In some embodiments, the term owner address refers to an address associated with a cryptography-based storage application that is able to transfer the cryptographic token by signing a blockchain operation (e.g., a blockchain transaction) with a private key associated with the cryptography-based storage application.

Owner address 306 may have a value identifying the owner of the token. In some examples, generation subsystem 116 may insert an address of the cryptography-based storage application of the first user into the cryptographic token such that the owner address 306 field of the generated cryptographic token contains an address associated with the first user (e.g., a string of alphanumeric characters, a wallet address, etc.). This may indicate, for example, that the first cryptography-based storage application has control of vehicle information (e.g., indicating that the first user owns the vehicle). In some examples, the address may be a string of alphanumeric characters. For example, the address may be a string of 32 alphanumeric characters and may identify what is sometimes referred to as a cryptographic wallet (e.g., a digital wallet). Some examples of hardware cryptographic wallets include Ledger®, and Trezor®. Software cryptographic wallets may include Metamask® and others. The address may be one that is identified in the request from the first user, for example, address data 409 of exemplary data structure 400 to enable performance of the action.

As described herein, generation subsystem 116 may also generate and insert resource identifier 309 into the cryptographic token. The resource identifier may identify a location for the first user identification information, vehicle information, and/or the like. For example, the resource identifier may be associated with the first cryptography-based storage application. Generation subsystem 116 may then insert the resource identifier into the cryptographic token represented by data structure 300 and store the information at a location indicated by the resource identifier (e.g., at data node 104).

In some embodiments, the resource identifier may be a URI. The resource identifier may include a link or another pointer, for example, to a location of a remote computing device such as data node 104, and/or the like. In some examples, the resource identifier may include a reference to a location on a third-party platform (e.g., website, application, etc.) allowing access to the user identification information, vehicle information, and/or the like.

According to some embodiments, the resource identifier may be encrypted to obtain an encrypted payload storing the resource identifier (e.g., URI) identifying the first user identification data at the remote computing device (e.g., data node 104). For example, the resource identifier may be encrypted by encryption subsystem 114 using a public key associated with the cryptography-based storage application of the first user (e.g., the user that owns the vehicle). Transfer system 102 may subsequently insert the encrypted payload into the cryptographic token. Further, when transferring control of the cryptographic token, the system may update (e.g., change, add, etc.) the encrypted payload so that it stores the resource identifier encrypted with a public key of the new owner. For example, the process of transferring control of the cryptographic token may further include requesting the user device (e.g., seller's device) decrypt the encrypted payload, e.g., using the private key of the user's first cryptography-based storage application. In particular, the system may transmit a request that the device associated with the cryptography-based storage application having control of the cryptographic token (e.g., owner's device) decrypt the encrypted payload to obtain the resource identifier. The user device may decrypt the encrypted payload with the private key associated with the associated cryptography-based storage application and transmit the decrypted resource identifier to the transfer system 102. The transfer system 102 may receive the resource identifier and encrypt the resource identifier using a public key associated with the second cryptography-based storage application to obtain a second encrypted payload and insert, into the cryptographic token, the second encrypted payload. In this way, the new owner, e.g., the second user, may have access to information stored at the resource identifier as the second user is associated with the cryptography-based storage application that has the private key that can decrypt the encrypted payload to obtain the resource identifier.

Furthermore, in the example where the resource identifier is encrypted (e.g., using the public key of the owner of the vehicle), a third-party device may request information associated with the vehicle (e.g., vehicle information, first user identification information, second user identification information, and/or the like). For example, the transfer system 102 may receive from a device associated with a cryptography-based storage application and an inquiring user, an access request for accessing the information (e.g., first user identification data). In some examples, the access request may include the identifier of the cryptographic token (e.g., address or token identifier). Using the identifier of the access request, the system may retrieve the encrypted payload associated with the cryptographic token. The system may then generate and subsequently transmit to the owner's device associated with the first cryptography-based storage application, a decryption request for decrypting the encrypted payload for accessing the first user identification data. The owner's device may decrypt the encrypted payload to obtain the resource identifier and access the data. The owner's device may transmit the data stored in the resource identifier. Once the requesting device receives the data stored in the resource identifier, the requesting device may transmit an indication of successful transfer of data. In response, the system may receive, from the requesting device, a second indication of successful transfer of first user identification information between the requesting device and the owner's device.

According to some examples, the cryptographic token may further include metadata indicating whether or not there is a physical title coexisting with the cryptographic token. For example, generating the cryptographic token, and/or during transfer of control of the cryptographic token, the transfer system may insert, into the cryptographic token, metadata indicating digital or physical title of the vehicle information and transmit, to the remote computing device, a command to access and update the first user identification data stored at the uniform resource identifier by adding the metadata indicating digital or physical title of the vehicle information. In some examples, only one of either a physical or digital title may be used to transfer vehicle title. The metadata indicating physical title may effectively disable the cryptographic token, such that the system prevents blockchain operations for transferring control of the cryptographic token when the metadata indicates physical title rather than digital title. In some examples, when the metadata indicates digital title, no physical titles may be used to transfer the title of the vehicle.

As described herein, the cryptographic token, (e.g., represented by data structure 300), may be generated in response to a request by a first user (e.g., a computing device of the first user) to generate the cryptographic token. FIG. 4 illustrates an exemplary data structure 400 for a request for generating the cryptographic token (e.g., a request to mint a cryptographic token). Exemplary data structure 400 may include vehicle identification data 403, user identification data 406, and address data 409. As described herein, transfer system 102 may receive a request, for example, from a first user at a first device and/or a first cryptography-based storage application via communication subsystem 112.

Vehicle identification data 403 may include information regarding the vehicle, such as previous owner information, current owner information, year and make of the vehicle, type of the vehicle (e.g., automobile, boat, snowmobile or ATV), vehicle identification number (VIN) or the hull identification number (HIN), date of the sale, purchase price, names and signatures of the buyer and the seller, and/or the like. User identification data 406 may include information regarding the first user, e.g., one or multiple owners of the vehicle. For example, user identification data may include driver's license, proof of auto insurance, financing documents (if applicable), proof of residence, proof of income, credit score and/or the like.

Address data 409 may be an identifier such as an address of a first cryptography-based storage application. For example, where a first user associated with a first cryptography-based storage application (e.g., cryptography-based storage application 108a) requests to generate the cryptographic token, address data 409 may indicate the address of the first cryptography-based storage application. In some examples, address data 409 may be a string of alphanumeric characters. For example, the address may be a string of 32 alphanumeric characters and may identify what is sometimes referred to as a cryptographic wallet. Some examples of hardware cryptographic wallets include Ledger® and Trezor®. Software cryptographic wallets may include MetaMask® and others. As described herein, address data 409 may be later used to encrypt the access token (e.g., using the public key associated with the target address) and may also be used to define an owner of the cryptographic token (e.g., as the owner address 306 of cryptographic token, e.g., represented by data structure 300).

In some examples, when receiving the request, e.g., represented by exemplary data structure 400, communication subsystem 112 may transmit vehicle identification data 403 and/or user identification data 406 to store the data at a remote computing device such as data node 104. For example, the communication subsystem 112 may transmit the data, to data node 104 for storing, and the data node 104 may generate a link to the first user identification data stored at the remote computing device. The link may then subsequently be stored as a resource identifier in the cryptographic token.

Additionally or alternatively, communication subsystem 112 may, when receiving the request (e.g., represented by exemplary data structure 400), pass each of vehicle identification data 403, user identification data 406, and address data 409 to generation subsystem 116. Additionally, or alternatively, communication subsystem 112 may store the vehicle identification data 403, user identification data 406, and address data 409 in memory and pass a pointer to the data in memory to generation subsystem 116.

Generation subsystem 116 of the transfer system 102 may generate the access token based on the one or more access parameters. The access token may be used to enable limited access to the resource of the first user. The access token may indicate the resource of the first user and one or more parameters for limiting access to the resource.

As described herein, according to some embodiments, the resource identifier may be encrypted. The encryption subsystem may encrypt the resource identifier. For example, the resource identifier may be encrypted using a key (e.g., public key) associated with the first cryptography-based storage application. For example, a function (e.g., RSA function) may be applied to a message (or the hash of a message), such as the resource identifier, with the public key of the first cryptography-based storage application belonging to the first user. The transfer system 102 may request that the first device decrypt the encrypted payload (e.g., using the private key of the first cryptography-based storage application) and transfer the data stored in the resource identifier to requesting parties (e.g., other devices of other users). Any suitable functions and/or alternative digital signature schemes may be used, such as PSS and/or the like.

Generation subsystem 116 may generate a blockchain operation for generating the cryptographic token. The cryptographic token may be controlled by the first cryptography-based storage application, and may store the link as a uniform resource identifier. For example, generation subsystem 116 may generate a blockchain operation for a blockchain node that may call and execute an on-chain program to generate the cryptographic token. An on-chain program may be a computer program or any suitable code for performing computing operations stored on a blockchain. For example, an on-chain program may reference a program stored on a blockchain, or other distributed ledger. On-chain programs may be used to automate the execution of a transaction, such as a blockchain operation. In another example, an on-chain program may refer to a smart contract. In some cases, the on-chain program may execute when predetermined conditions are satisfied. In one example, the on-chain program may be a smart contract deployed on a blockchain.

As part of the generation process, the on-chain program may insert resource identifier storing the user identification data 406 and/or vehicle identification data 403 into the cryptographic token when executed. The generated token may also be generated to be controlled by the first address associated with the first cryptography-based storage application. For example, the on-chain program may include the address data 409 as the owner address 306 of the cryptographic token. The on-chain program may commit the cryptographic token (e.g., mint the cryptographic token) to the blockchain via a blockchain operation.

When the cryptographic token has been generated, communication subsystem 112 may receive one or more notifications of successful blockchain operation. Subsequently, the transfer system may transmit one or more notifications to the users. Communication subsystem 112 may transmit a message (e.g., email, text, etc.) to a device of the first user to notify the first user that the cryptographic token has been generated. For example, communication subsystem 112 may obtain, from a blockchain node, such as node 109, an indication (e.g., a signal, notification, etc.) of a successful blockchain operation for committing the cryptographic token to the blockchain. In response to obtaining the indication, transfer system 102 may (e.g., via communication subsystem 112), transmit, to the first device, a signal indicating the identifier of the cryptographic token. As referred to herein, committing to a blockchain may include adding a transaction and/or adding a unique token (e.g., a token identifying a unique and unchangeable reference to some data) to a block of a blockchain (e.g., assigned to a cryptography-based storage application).

In some examples, the entity associated with the device initiating the transfer of control may not own the vehicle or may only own the vehicle in part, such as in the case of leasing a vehicle. That is, one party may own the vehicle and another party may be in possession of the vehicle (e.g., using the vehicle). For example, the transfer system 102 may receive, from a device (e.g., associated with a user leasing the vehicle) associated with a cryptography-based storage application, a request for transferring control of the cryptographic token to a cryptography-based storage application associated with a device (e.g., of a purchaser of the vehicle). The cryptography-based storage application may not have control of the cryptographic token (e.g., the owner of the cryptography-based storage application may not own the vehicle). The system may then determine the address of the cryptography-based storage application having control of the cryptographic token (e.g., cryptography-based storage application of the owner of the vehicle). Using the address of the cryptography-based storage application having control, the system may determine a device identifier for a device associated with the cryptography-based storage application having control and transmit, to the device, a blockchain operation for transferring control of the cryptographic token to that cryptography-based storage application. In some examples, the system may store, for each cryptography-based storage application, a device identifier identifying the device. For example, the system may register a user's device and a corresponding cryptography-based storage application when the user first uses the system.

In some examples, rather than transferring control of vehicle information, the methods and techniques disclosed may be used in transferring control of information relating to any property (e.g., watches, houses, land, etc.). For example, as described herein the cryptographic tokens may represent ownership of any property and may also allow a user to access information regarding the property. For example, the cryptographic token may include an encrypted payload storing a resource identifier (e.g., uniform resource identifier (URI)) identifying information associated with the vehicle (e.g., details regarding the property, previous owner(s), current status, past owner(s)). Control of the cryptographic token by a cryptography-based storage application associated with a user may indicate that the user owns the property title. A transfer system may be used to perform operations described herein. The cryptographic tokens may be used by the transfer system as described herein. For example, home ownership transfers may be used with the disclosed embodiments.

According to some embodiments, the transfer to the second user may only occur if one or more conditions are met. In some examples, transfer system 102 may only transmit the blockchain request to transfer, if a predetermined threshold for a confidence level was met. The confidence level may correspond to a likelihood or probability that the transfer is not fraudulent. For example, the confidence level may correspond to the likelihood that the first and/or second user is indeed associated with the first and/or second cryptography-based storage application (e.g., that the seller and purchaser of the vehicle is performing the transfer via their own digital wallets), respectively. Alternatively or additionally, the confidence level may correspond to the likelihood that the first and/or second cryptography-based storage application is associated with the first and/or second device, respectively.

In some examples, the confidence level may be calculated, at least in part, based on whether a user at the second device is the correct user, e.g., is not a fraudulent user of the second device and/or is the owner of the second device, etc. For example, the confidence level may be calculated based on whether the second user is able to prove and/or the first user is able to verify that the second user to whom the first user is attempting to transfer the association of the vehicle is associated with the second device (e.g., owns or is authorized to use the second device). For example, the user device (e.g., the device associated with the cryptography-based storage application having control of the cryptographic token) may verify that the second user is associated with the second device by using near field communication (NFC) or Bluetooth technology. For example, the communication subsystem 112 and/or any of the devices 108a-108n may have NFC and/or Bluetooth capabilities and may use NFC and/or Bluetooth capabilities to perform verification as described herein.

In some embodiments, the second user device may be NFC enabled and have one or more identification (ID) documents which includes data for identifying the second user at the transfer system. The second user may tap the second device at or place the second device within range of the user device of the first user to initiate NFC transmission. The first user device may transmit at least a portion of the ID document(s) data via NFC and the transfer system may match the received data from the ID document(s) to the existing document data stored at the transfer system or at a remote database accessible by the transfer system. The transfer system may send identifying information of the second user (e.g., name, photo ID, etc.). The first user and/or user device may then confirm that the identifying information matches the second user.

Alternatively, or additionally, the second user may use a similar process to verify that the first user is associated with the user device (e.g., the first user owns the user device and therefore the vehicle association, the first user is not a fraudulent user of the user device, etc.).

The confidence level may be calculated by the transfer system and/or any of devices 108a-108n. The confidence level may be calculated as a function of different parameters, such as whether the devices were able to verify their association with the parties (e.g., the first and/or second user) part of the transfer. The confidence level may also be calculated as a function of data associated with the request for transferring an association of the vehicle. For example, location of the transfer (e.g., whether the device that initiated the transfer is in the same country of residence as the first user), number of transfers initiated in a time frame (e.g., whether a user had exceeded a threshold number of transfers within a period of time), and/or the like.

Figure 5:
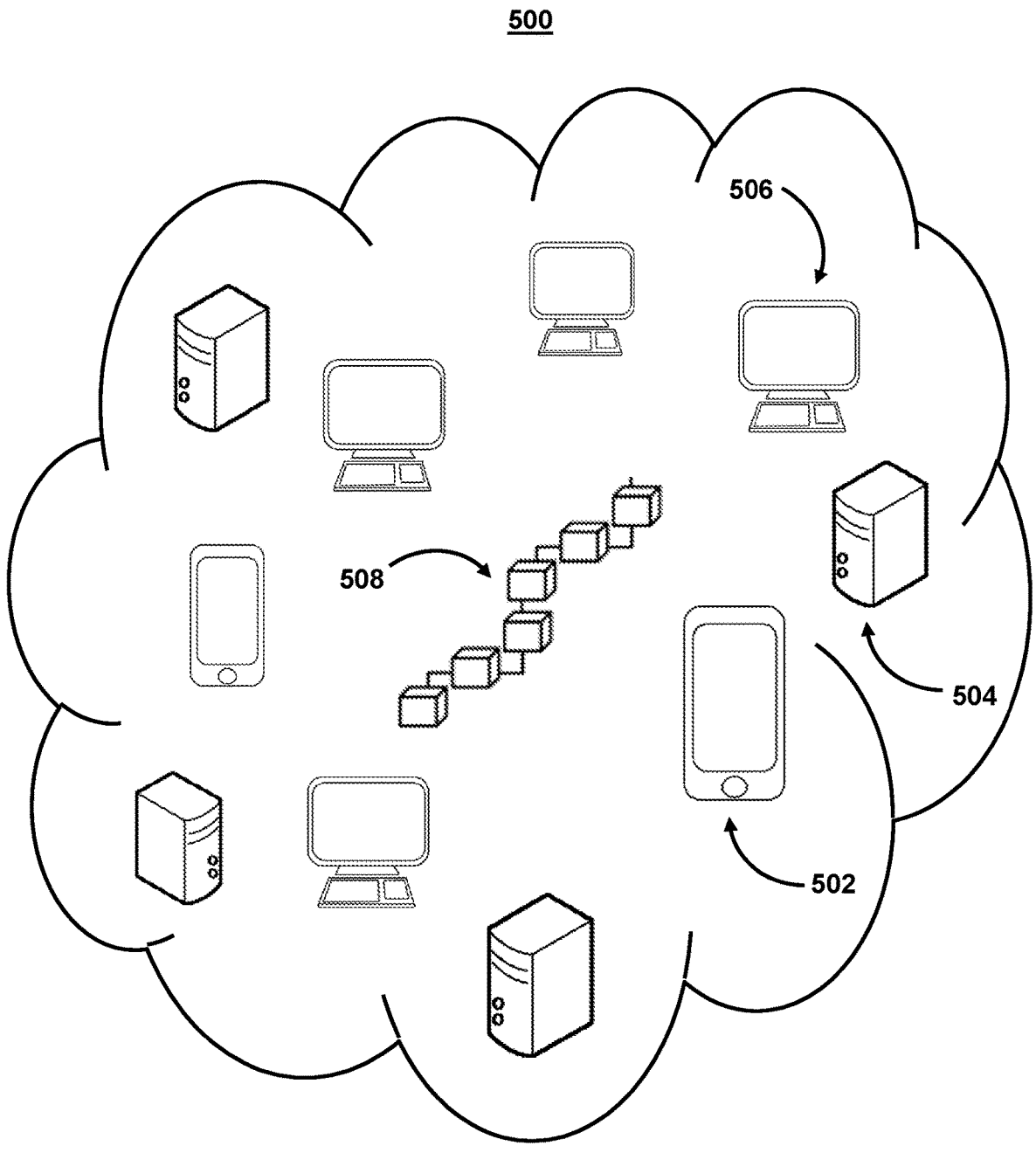
FIG. 5 is an illustrative diagram for a decentralized environment for performing blockchain functions, in accordance with one or more embodiments.

FIG. 5 shows an illustrative diagram for a decentralized environment for performing blockchain functions (sometimes referred to as blockchain operations), in accordance with one or more embodiments. For example, the diagram presents various components that may be used for transferring control of vehicle information to other users using NFTs in some embodiments.

As shown in FIG. 5, system 500 may include multiple user devices (e.g., user device 502, user device 504, and/or user device 506). For example, system 500 may comprise a distributed state machine, in which each of the components in FIG. 5 acts as a client of system 500. For example, system 500 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 500 may interact with, and facilitate the function of, blockchain 508.

It should be noted that, while shown as a smartphone, a personal computer, and a server in FIG. 5, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing the system 500 performing a blockchain function may equally be applied to, and correspond to, an individual user device (e.g., user device 502, user device 504, and/or user device 506) performing the blockchain function. That is, system 500 may correspond to the user devices (e.g., user device 502, user device 504, and/or user device 506) collectively or individually.

Each of the user devices may be used by the system to conduct blockchain functions. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related NFTs, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including an NFT. An NFT may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 5, one or more user devices may include a digital wallet (e.g., digital wallet associated with user device 504) used to perform blockchain functions. A digital wallet may be referred to as a cryptography-based storage application. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets, such as hot wallets and cold wallets. Hot wallets are connected to the Internet while cold wallets are not. Most digital wallet holders hold both a hot wallet and a cold wallet. Hot wallets are most often used to perform blockchain functions, while a cold wallet is generally used for managing a user account and may have no connection to the Internet.

As shown in FIG. 5, one or more user devices may include a private key and/or digital signature. Digital signature may sometimes be referred to as cryptographic signature. For example, system 500 may use cryptographic systems for conducting blockchain functions, such as for transferring control of vehicle information to other users using NFTs. For example, system 500 may use public key cryptography, which features a pair of digital keys (e.g., which may comprise strings of data). In such cases, each pair comprises a public key (e.g., which may be public) and a private key (e.g., which may be kept private). System 500 may generate the key pairs using cryptographic algorithms (e.g., featuring one-way functions). System 500 may then encrypt a message (or other blockchain function) using an intended receiver's public key such that the encrypted message may be decrypted only with the receiver's corresponding private key. In some embodiments, system 500 may combine a message with a private key to create a digital signature on the message. For example, the digital signature may be used to verify the authenticity of blockchain functions. As an illustration, when conducting blockchain functions, system 500 may use the digital signature to prove to every node in the system that it is authorized to conduct the blockchain functions.

For example, system 500 may comprise a plurality of nodes for the blockchain network. Each node may correspond to a user device (e.g., user device 502). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 502 may request a blockchain function (e.g., conduct a transaction). The blockchain function may be authenticated by user device 504 and/or another node (e.g., a user device in the community network of system 500). For example, using cryptographic keys, system 500 may identify users and give access to their respective user accounts (e.g., corresponding digital wallets) within system 500. Using private keys (e.g., known only to the respective users) and public keys (e.g., known to the community network), system 500 may create digital signatures to authenticate the users.

Following an authentication of the blockchain function, the blockchain function may be authorized. For example, after the blockchain function is authenticated between the users, system 500 may authorize the blockchain function prior to adding it to the blockchain. System 500 may add the blockchain function to blockchain 508. System 500 may perform this based on a consensus of the user devices within system 500. For example, system 500 may rely on a majority (or other metric) of the nodes in the community network (e.g., user device 502, user device 504, and/or user device 506) to determine that the blockchain function is valid. In response to validation of the block, a node user device (e.g., user device 502, user device 504, and/or user device 506) in the community network (e.g., a miner) may receive a reward (e.g., in a given cryptocurrency) as an incentive for validating the block.

To validate the blockchain function, system 500 may use one or more validation protocols and/or validation (or consensus) mechanisms. For example, system 500 may use a Proof of Work ("POW"), mechanism in which a user device must provide evidence that it performed computational work to validate a blockchain function and thus this mechanism provides a manner for achieving consensus in a decentralized manner, as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively, or additionally, system 500 may use a Proof of Stake ("POS") mechanism in which a user account (e.g., corresponding to a node on the blockchain network) is required to have, or "stake," a predetermined amount of tokens in order for system 500 to recognize it as a validator in the blockchain network.

Computing Environment

FIG. 6 shows an example computing system that may be used in accordance with some embodiments of this disclosure. In some instances, computer system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computer system 600. Further, processes and modules described herein may be executed by one or more processing systems similar to that of computer system 600.

Computer system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computer system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computer system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific integrated circuit). Computer system 600 may include a plurality of computing devices (e.g., distributed computer systems) to implement various processing functions.

I/O device interface 630 may provide an interface for connection of I/O device(s) 660 to computer system 600. I/O device(s) may include devices that receive input (e.g., from a user) or output information (e.g., to a user). I/O device(s) 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O device(s) 660 may be connected to computer system 600 through a wired or wireless connection. I/O device(s) 660 may be connected to computer system 600 from a remote location. I/O device(s) 660 located on remote computer systems, for example, may be connected to computer system 600 via a network and a network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, read-only memory (ROM), programmable ROM (PROM), erasable PROM (EPROM), electrically EPROM (EEPROM), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O device(s) 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems (e.g., multiple instances of computer system 600) configured to host different portions or instances of embodiments. Multiple computer systems may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

FIG. 7 is a flowchart 700 of operations for transferring control of vehicle information. The operations of FIG. 7 may use components described in relation to FIG. 5 and FIG. 6. In some embodiments, transfer system 102 may include one or more components of system 500 and/or computer system 600.

At 702, transfer system 102 receives a request for transferring an association of a vehicle from a first user to a second user. For example, transfer system 102 may receive the first request from a user device, such as through network interface 640 and/or I/O device interface 630 from I/O device(s) 660 (e.g., any of user device 502, user device 504, and user device 506), associated with a first cryptography-based storage application (e.g., cryptography-based storage application 180*a*) of a first user (e.g., over network 150). According to some examples, the request may be a first request for transferring an association of a vehicle from a first user to a second user, and may include (1) an identifier of a cryptographic token that associates the vehicle and the first user, (2) second user data, and (3) a second address of a second cryptography-based storage application associated with the second user. The cryptographic token may be, for example, a token such as represented by a data structure 300 of FIG. 3.

At 704, transfer system 102 generates a blockchain operation for transferring control of the cryptographic token. In some examples, the system may generate the blockchain operation using one or more of processor 610*a*, processor 610*b* . . . processor 610*n*. According to some examples, transfer system 102 may generate a first blockchain operation for transferring control of the cryptographic token from a first cryptography-based storage application associated with the first user to the second cryptography-based storage application associated with the second user. The first blockchain operation may include the second address associated with the second cryptography-based storage application.

At 706, transfer system 102 transmits the blockchain operation for transferring control of the cryptographic token to the second cryptography-based storage application. For example, transfer system 102 may transmit the blockchain operation to a user device, e.g., via I/O device interface 630 and/or network interface 640.

At 708, transfer system 102 transmits a command to update first user identification data stored at a link, for example, in response to receiving an indication of successful blockchain operation from a blockchain node. For example, the transfer system 102 may use I/O device interface 630 and/or network interface 640 to transmit the command to a remote computing device.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for transferring control of vehicle information, the method comprising: receiving, from a user device, a first request for transferring an association of a vehicle from a first user to a second user, wherein the first request comprises (1) an identifier of a cryptographic token that associates the vehicle and the first user, (2) second user data, and (3) a second address of a second cryptography-based storage application associated with the second user; generating a first blockchain operation for transferring control of the cryptographic token from a first cryptography-based storage application associated with the first user to the second cryptography-based storage application associated with the second user, wherein the first blockchain operation comprises the second address associated with the second cryptography-based storage application; transmitting, to the user device, the first blockchain operation for transferring control of the cryptographic token to the second cryptography-based storage application; and in response to receiving an indication of successful blockchain operation from a blockchain node, transmitting, to a remote computing device, a command to update first user identification data stored at a link, wherein the command to update includes second user identification data.

2. The method of the preceding embodiment, further comprising: receiving, from the user device, a second request for generating the cryptographic token, wherein the second request comprises (1) vehicle identification data, (2) the first user identification data, and (3) a first address of the first cryptography-based storage application corresponding to the first user; storing the first user identification data at the remote computing device, wherein the storing generates the link to the first user identification data stored at the remote computing device; and generating a second blockchain operation for generating the cryptographic token, wherein the cryptographic token is controlled by the first cryptography-based storage application, and wherein the cryptographic token stores the link as a uniform resource identifier.

3. The method of any of the preceding embodiments, wherein generating the first request further comprises: encrypting the uniform resource identifier into an encrypted payload using a first key associated with the first cryptography-based storage application; and inserting, into the cryptographic token, the encrypted payload.

4. The method of any of the preceding embodiments, further comprising: receiving, from a second device associated with the second cryptography-based storage application, an access request for accessing the first user identification data, wherein the access request comprises the identifier of the cryptographic token; retrieve, based on the identifier of the cryptographic token in the access request, the encrypted payload associated with the cryptographic token; generating and transmitting, to the user device associated with the first cryptography-based storage application, a decryption request for decrypting the encrypted payload for accessing the first user identification data; and receiving, from the second device, a second indication of successful transfer of first user identification information between the second device and the user device.

5. The method of any of the preceding embodiments, wherein the command causes a second device associated with the second user to perform: transmitting a request to the user device for decrypting the encrypted payload to obtain the uniform resource identifier; receiving, from the user device, the uniform resource identifier; encrypting the uniform resource identifier using a second key associated with the second cryptography-based storage application to obtain a second encrypted payload; and inserting, into the cryptographic token, the second encrypted payload.

6. The method of any of the preceding embodiments, further comprising: receiving, from a third device associated with a third cryptography-based storage application, a third request for transferring control of the cryptographic token to a fourth cryptography-based storage application associated with a fourth device, wherein the third cryptography-based storage application does not have control of the cryptographic token; generating and transmitting, to the blockchain node, a third blockchain operation for determining an address of a cryptography-based storage application having control of the cryptographic token; determining the address of the cryptography-based storage application having control of the cryptographic token; determining, using the address of the cryptography-based storage application having control, a device identifier for a fifth device associated with the cryptography-based storage application having control; and transmitting, to the fifth device, a fourth blockchain operation for transferring control of the cryptographic token to the fourth cryptography-based storage application.

7. The method of any of the preceding embodiments, further comprising: inserting, into the cryptographic token, metadata indicating digital title of the vehicle information; and transmitting, to the remote computing device, a second command to access and update the first user identification data stored at the uniform resource identifier by adding the metadata indicating digital title of the vehicle information.

8. The method of any of the preceding embodiments, further comprising: inserting, into the cryptographic token, metadata indicating physical title of the vehicle information; and transmitting, to the remote computing device, a second command to access and update the first user identification data stored at the uniform resource identifier by adding the metadata indicating physical title of the vehicle information.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the one or more processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for transferring control of vehicle information, the system comprising:

one or more processors and one or more non-transitory computer-readable storage media storing instructions that, when executed by the one or more processors, cause the one or more processors to perform operations comprising:

receiving, from a user device, a first request for generating a non-fungible token that associates a vehicle and a first user, wherein the first request comprises (1) vehicle identification data, (2) first user identification data, and (3) a first address of a first cryptography-based storage application corresponding to the first user;

storing the first user identification data at a remote computing device, wherein the storing generates a link to the first user identification data stored at the remote computing device;

generating a first blockchain operation for generating the non-fungible token, wherein generating the first blockchain operation comprises:

encrypting a uniform resource identifier, corresponding to the link, into an encrypted payload; and inserting the encrypted payload into the non-fungible token, wherein the non-fungible token is controlled by the first cryptography-based storage application;

receiving, from the user device, a second request for transferring an association of the vehicle from the first user to a second user, wherein the second request comprises (1) an identifier of the non-fungible token, (2) second user data, and (3) a second address of a second cryptography-based storage application associated with the second user;

generating a second blockchain operation for transferring control of the non-fungible token from the first cryptography-based storage application to the second cryptography-based storage application, wherein the second blockchain operation comprises the second address associated with the second cryptography-based storage application;

transmitting, to the user device, the second blockchain operation for transferring control of the non-fungible token to the second cryptography-based storage application; and in response to receiving an indication of successful blockchain operation from a blockchain node, transmitting, to the remote computing device, a command to update user identification data accessible via the link, wherein the command to update includes second user identification data.

2. The system of claim 1, wherein encrypting the uniform resource identifier comprises encrypting the uniform resource identifier into the encrypted payload using a key associated with the first cryptography-based storage application.

3. The system of claim 2, wherein the instructions cause the one or more processors to perform operations comprising:

receiving, from a second device associated with the second cryptography-based storage application, an access request for accessing the first user identification data, wherein the access request comprises the identifier of the non-fungible token;

retrieve, based on the identifier of the non-fungible token in the access request, the encrypted payload associated with the non-fungible token;

generating and transmitting, to the user device associated with the first cryptography-based storage application, a decryption request for decrypting the encrypted payload for accessing the first user identification data; and receiving, from the second device, a second indication of successful transfer of the first user identification data between the second device and the user device.

4. The system of claim 1, wherein the instructions cause the one or more processors to perform operations comprising:

receiving, from a third device associated with a third cryptography-based storage application, a third request for transferring control of the non-fungible token to a fourth cryptography-based storage application associated with a fourth device, wherein the third cryptography-based storage application does not have control of the non-fungible token;

generating and transmitting, to the blockchain node, a second blockchain operation request for determining an address of a cryptography-based storage application having control of the non-fungible token;

determining the address of the cryptography-based storage application having control of the non-fungible token;

determining, using the address of the third cryptography-based storage application, a device identifier for the third device; and transmitting, to the third device, a blockchain operation request for transferring control of the non-fungible token to the fourth cryptography-based storage application.

5. A method comprising:

receiving a prior request for generating a cryptographic token that associates a vehicle and a first user, wherein the prior request comprises (1) vehicle identification data, (2) first user identification data, and (3) a first address of a first cryptography-based storage application corresponding to the first user;

storing the first user identification data at a remote computing system;

generating a prior blockchain operation for generating the cryptographic token, wherein generating the prior blockchain operation comprises:

encrypting a uniform resource identifier, corresponds to a link to the first user identification data stored at the remote computing system, into an encrypted payload; and inserting the encrypted payload into the cryptographic token, wherein the cryptographic token is controlled by the first cryptography-based storage application;

receiving, from a user device, a first request for transferring an association of the vehicle from the first user to a second user, wherein the first request comprises (1) an identifier of the cryptographic token that associates the vehicle and the first user, (2) second user data, and (3) a second address of a second cryptography-based storage application associated with the second user, generating a first blockchain operation for transferring control of the cryptographic token from the first cryptography-based storage application associated with the first user to the second cryptography-based storage application associated with the second user, wherein the first blockchain operation comprises the second address associated with the second cryptography-based storage application;

transmitting, to the user device, the first blockchain operation for transferring control of the cryptographic token to the second cryptography-based storage application; and in response to receiving an indication of successful blockchain operation from a blockchain node, transmitting, to the remote computing system, a command to update user identification data accessible via the link, wherein the command to update includes second user identification data.

6. The method of claim 5, wherein encrypting the uniform resource identifier comprises encrypting the uniform resource identifier into the encrypted payload using a first key associated with the first cryptography-based storage application.

7. The method of claim 6, further comprising:

receiving, from a second device associated with the second cryptography-based storage application, an access request for accessing the first user identification data, wherein the access request comprises the identifier of the cryptographic token;

retrieve, based on the identifier of the cryptographic token in the access request, the encrypted payload associated with the cryptographic token;

generating and transmitting, to the user device associated with the first cryptography-based storage application, a decryption request for decrypting the encrypted payload for accessing the first user identification data; and receiving, from the second device, a second indication of successful transfer of first user identification information between the second device and the user device.

8. The method of claim 6, wherein the command causes a second device associated with the second user to perform:

transmitting a request to the user device for decrypting the encrypted payload to obtain the uniform resource identifier;

receiving, from the user device, the uniform resource identifier;

encrypting the uniform resource identifier using a second key associated with the second cryptography-based storage application to obtain a second encrypted payload; and inserting, into the cryptographic token, the second encrypted payload.

9. The method of claim 5, further comprising:

receiving, from a third device associated with a third cryptography-based storage application, a third request for transferring control of the cryptographic token to a fourth cryptography-based storage application associated with a fourth device, wherein the third cryptography-based storage application does not have control of the cryptographic token;

generating and transmitting, to the blockchain node, a third blockchain operation for determining an address of a cryptography-based storage application having control of the cryptographic token;

determining the address of the cryptography-based storage application having control of the cryptographic token;

determining, using the address of the cryptography-based storage application having control, a device identifier for a fifth device associated with the cryptography-based storage application having control; and transmitting, to the fifth device, a fourth blockchain operation for transferring control of the cryptographic token to the fourth cryptography-based storage application.

10. The method of claim 5, further comprising:

inserting, into the cryptographic token, metadata indicating digital title of the vehicle; and transmitting, to the remote computing system, a second command to access and update the first user identification data stored at the uniform resource identifier by adding the metadata indicating digital title of the vehicle.

11. The method of claim 5, further comprising:

inserting, into the cryptographic token, metadata indicating physical title of the vehicle identification data; and transmitting, to the remote computing system, a second command to access and update the first user identification data stored at the uniform resource identifier by adding the metadata indicating physical title of the vehicle identification data.

12. One or more non-transitory computer-readable media storing instructions that, when executed by one or more processors, cause the one or more processors to perform operations comprising:

receiving a prior request for generating a cryptographic token that associates a vehicle and a first user, wherein the prior request comprises (1) vehicle identification data, (2) first user identification data, and (3) a first address of a first cryptography-based storage application corresponding to the first user;

storing the first user identification data at a remote computing system;

generating a prior blockchain operation for generating the cryptographic token, wherein generating the prior blockchain operation comprises:

encrypting a uniform resource identifier, corresponds to a link to the first user identification data stored at the remote computing system, into an encrypted payload; and inserting the encrypted payload into the cryptographic token, wherein the cryptographic token is controlled by the first cryptography-based storage application;

receiving, from a user device, a first request for transferring an association of the vehicle from the first user to a second user, wherein the first request comprises (1) an identifier of the cryptographic token that associates the vehicle and the first user, (2) second user data, and (3) a second address of a second cryptography-based storage application associated with the second user;

generating a first blockchain operation for transferring control of the cryptographic token from the first cryptography-based storage application associated with the first user to the second cryptography-based storage application associated with the second user, wherein the first blockchain operation comprises the second address associated with the second cryptography-based storage application;

transmitting, to the user device, the first blockchain operation for transferring control of the cryptographic token to the second cryptography-based storage application; and in response to receiving an indication of successful blockchain operation from a blockchain node, transmitting, to the remote computing system, a command to update user identification data accessible via the link, wherein the command to update includes second user identification data.

13. The one or more non-transitory computer-readable media of claim 12, wherein encrypting the uniform resource identifier comprises encrypting the uniform resource identifier into the encrypted payload using a first key associated with the first cryptography-based storage application.

14. The one or more non-transitory computer-readable media of claim 13, wherein the instructions cause the one or more processors to perform operations comprising:

receiving, from a second device associated with the second cryptography-based storage application, an access request for accessing the first user identification data, wherein the access request comprises the identifier of the cryptographic token;

retrieving, based on the identifier of the cryptographic token in the access request, the encrypted payload associated with the cryptographic token;

generating and transmitting, to the user device associated with the first cryptography-based storage application, a decryption request for decrypting the encrypted payload for accessing the first user identification data; and receiving, from the second device, a second indication of successful transfer of first user identification information between the second device and the user device.

15. The one or more non-transitory computer-readable media of claim 13, wherein the command causes a second device associated with the second user to perform:

transmitting a request to the user device for decrypting the encrypted payload to obtain the uniform resource identifier;

receiving, from the user device, the uniform resource identifier;

encrypting the uniform resource identifier using a second key associated with the second cryptography-based storage application to obtain a second encrypted payload; and inserting, into the cryptographic token, the second encrypted payload.

16. The one or more non-transitory computer-readable media of claim 12, wherein the instructions cause the one or more processors to perform operations further comprising:

receiving, from a third device associated with a third cryptography-based storage application, a third request for transferring control of the cryptographic token to a fourth cryptography-based storage application associated with a fourth device, wherein the third cryptography-based storage application does not have control of the cryptographic token;

generating and transmitting, to the blockchain node, a third blockchain operation for determining an address of a cryptography-based storage application having control of the cryptographic token;

determining the address of the cryptography-based storage application having control of the cryptographic token;

determining, using the address of the cryptography-based storage application having control, a device identifier for a fifth device associated with the cryptography-based storage application having control; and transmitting, to the fifth device, a fourth blockchain operation for transferring control of the cryptographic token to the fourth cryptography-based storage application.

17. The one or more non-transitory computer-readable media of claim 12, wherein the instructions cause the one or more processors to perform operations further comprising:

inserting, into the cryptographic token, metadata indicating a digital title of vehicle; and transmitting, to the remote computing system, a second command to access and update the first user identification data stored at the uniform resource identifier by adding the metadata indicating the digital title of the vehicle.

18. The one or more non-transitory computer-readable media of claim 12, wherein the instructions cause the one or more processors to perform operations further comprising:

inserting, into the cryptographic token, metadata indicating a physical title of the vehicle; and transmitting, to the remote computing system, a second command to access and update the first user identification data stored at the uniform resource identifier by adding the metadata indicating the physical title of the vehicle.

\* \* \* \* \*